US012316711B2

(12) United States Patent
Young et al.

(10) Patent No.: US 12,316,711 B2
(45) Date of Patent: *May 27, 2025

(54) SYSTEM AND METHODS FOR MANAGING PHYSICAL NETWORK FUNCTIONS VIA ORCHESTRATION

(71) Applicant: Verizon Patent and Licensing Inc., Basking Ridge, NJ (US)

(72) Inventors: Kristen Sydney Young, Mine Hill, NJ (US); Jason T. Wright, Novi, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,233

(22) Filed: Nov. 13, 2023

(65) Prior Publication Data

US 2024/0080369 A1    Mar. 7, 2024

Related U.S. Application Data

(63) Continuation of application No. 17/680,976, filed on Feb. 25, 2022, now Pat. No. 11,856,066.

(51) Int. Cl.
| | | |
|---|---|---|
| *G06F 15/173* | (2006.01) | |
| *G06F 8/65* | (2018.01) | |
| *H04L 67/00* | (2022.01) | |
| *H04L 67/55* | (2022.01) | |
| *H04L 67/56* | (2022.01) | |

(52) U.S. Cl.
CPC .............. *H04L 67/34* (2013.01); *G06F 8/65* (2013.01); *H04L 67/55* (2022.05); *H04L 67/56* (2022.05)

(58) Field of Classification Search
None
See application file for complete search history.

(56) References Cited

U.S. PATENT DOCUMENTS

| | | | |
|---|---|---|---|
| 9,667,509 B1* | 5/2017 | Levi | H04L 43/091 |
| 10,469,317 B1* | 11/2019 | Jiang | H04L 41/082 |
| 11,711,405 B2* | 7/2023 | Oyman | H04L 65/1016 |
| | | | 709/227 |
| 11,889,391 B2* | 1/2024 | Shan | H04W 12/08 |
| 12,010,734 B2* | 6/2024 | Sosnin | H04W 72/0453 |
| 2017/0208147 A1* | 7/2017 | I'Anson | H04L 41/0896 |
| 2019/0052549 A1 | 2/2019 | Duggal et al. | |
| 2020/0028749 A1 | 1/2020 | Dhandu et al. | |
| 2020/0053062 A1* | 2/2020 | Stuntebeck | H04L 63/1408 |
| 2021/0194749 A1* | 6/2021 | Toeroe | H04L 41/5048 |
| 2021/0377053 A1* | 12/2021 | Mahajan | H04W 12/069 |
| 2022/0035650 A1* | 2/2022 | Banerjee | H04L 12/4641 |
| 2022/0159501 A1* | 5/2022 | Chou | H04L 41/122 |
| 2022/0295242 A1 | 9/2022 | Taft et al. | |

(Continued)

*Primary Examiner* — Phuoc H Nguyen

(57) ABSTRACT

Systems and methods described herein provide life cycle management for physical network function (PNFs) via an orchestrator using PNF proxies. A network device in a service provider network receives a software package for a virtual network function (VNF) serving as PNF proxy for a type of PNF. The software package includes a proxy descriptor and external virtual links (VLs) for the type of PNF. The network device associates, an instance of the PNF proxy with an installed PNF, creates the instance of the PNF proxy as a VNF in a cloud platform, and provides a record of the created instance of the PNF proxy to an active inventory system.

20 Claims, 7 Drawing Sheets

(56) References Cited

U.S. PATENT DOCUMENTS

2022/0311673 A1* 9/2022 Zu .................. G06F 9/45558
2023/0131703 A1* 4/2023 Mahajan ............ H04L 63/0823
713/153

\* cited by examiner

SYSTEM AND METHODS FOR MANAGING PHYSICAL NETWORK FUNCTIONS VIA ORCHESTRATION

CROSS-REFERENCE TO RELATED APPLICATION

This application is a continuation of U.S. patent application Ser. No. 17/680,976, filed on Feb. 25, 2022, and titled "System and Methods for Managing Physical Network Functions Via Orchestration," the contents of which are incorporated herein by reference.

BACKGROUND

Advanced wireless networks, such as Fifth Generation (5G) networks, incorporate many new advances in technology. For example, a 5G network may have the capability to perform network slicing to increase network efficiency and performance. In another example, a 5G radio network may include New Radio (NR)-related features, such as Self Organizing Network (SON) capabilities, splitting a wireless station function into a Central Unit (CU) and Distributed Units (DUs), and Integrated Access and Backhaul nodes.

Some features of advanced wireless networks are enabled through the use of Virtual Network Functions (VNFs). VNFs include network functions that have been moved out of dedicated hardware devices into software that runs on commodity hardware. VNFs may be executed, for example, as one or more virtual machines on top of a hardware networking infrastructure. VNFs can be considered building blocks and can be connected or combined together to provide multiple capabilities required to complete a networking communication service(s). However, even with the continuing development of virtualization using VNFs, physical network functions (PNFs) will continue to maintain a significance presence in wireless networks, as virtualization of some network functions remains problematic or impractical.

DETAILED DESCRIPTION

The following detailed description refers to the accompanying drawings. The same reference numbers in different drawings may identify the same or similar elements. Also, the following detailed description does not limit the invention.

Physical network functions (PNFs) will continue to maintain a significance presence in most networks, including as advanced wireless networks. For mobile network operators, the life cycle management of PNFs today is performed differently from that of virtual network functions (VNFs). A traditional management plane is used for PNFs, while orchestrators, such as a network function virtualization orchestrator (NFVO), are used for VNFs. The different life cycle management approaches prevent a unified life cycle management solution for PNFs and VNFs, which introduces complexity for mobile network operators.

Systems and methods described herein provide for life cycle management for PNFs via an orchestrator using PNF proxies. The systems and methods enable a unified life cycle management solution for PNFs and VNFs. The unified life cycle also consolidates network inventory management and facilitates correlation for assurance purposes.

According to an implementation, a network device in a service provider network receives a software package for a virtual network function (VNF) serving as PNF proxy for a type of PNF. The software package includes a proxy descriptor and external virtual links (VLs) for the type of PNF. The network device associates, an instance of the PNF proxy with an installed PNF, creates the instance of the PNF proxy as a VNF in a cloud platform, and provides a record of the created instance of the PNF proxy to an active inventory system.

Figure 1:
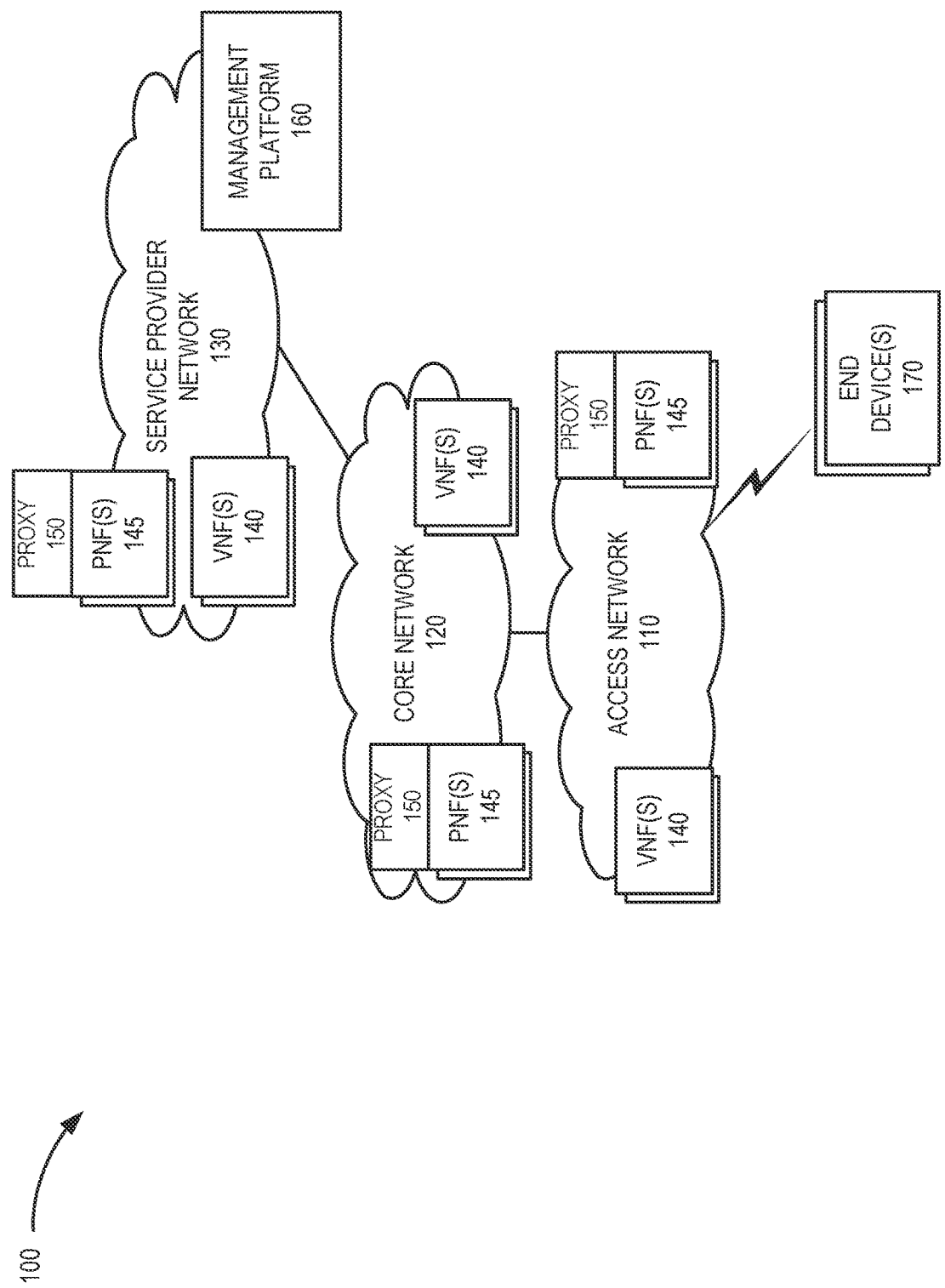
FIG. 1 is a diagram illustrating an example environment in which a unified life cycle management solution described herein may be implemented.

FIG. 1 is a diagram of an example network environment 100 in which systems and/or methods, described herein, may be implemented. As shown in FIG. 1, environment 100 may include an access network 110, a core network 120, a service provider network 130, a data network 140, an orchestrator 160, and end devices 170. According to other embodiments, environment 100 may include additional networks, fewer networks, differently-arranged networks, and/or different types of networks than those illustrated and described herein.

Environment 100 may be implemented to include wired, optical, and/or wireless links among the devices and the networks illustrated. A communication link may be direct or indirect. For example, an indirect connection may involve an intermediary device and/or an intermediary network not illustrated in FIG. 1.

Access network 110 may include one or multiple networks of one or multiple types and technologies. For example, access network 110 may include a Fifth Generation (5G) radio access network (RAN), Fourth Generation (4G) RAN, and/or another type of future generation RAN. By way of further example, access network 110 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 110 may further include other types of wireless networks, such as a WiFi network, a local area network (LAN), or another type of network that may provide an on-ramp to access stations and/or core network 120.

Depending on the implementation, access network 110 may include one or multiple access devices, such as a next generation Node B (gNB or gNodeB) for a 5G NR RAN, an evolved Node B (eNB or eNodeB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 110 may be implemented according to various wireless technologies (e.g., radio access technology (RAT), etc.), wireless standards, wireless frequencies/bands, and so forth. According to an implementation, an access device may include multiple distributed components, such as a central unit (CU), a distributed unit (DU), a remote unit (RU or a remote radio unit (RRU)), or another type of distributed components. Furthermore, in some implementations, access network 110 may include a Multi-Access Edge Computing (MEC) system that performs cloud computing and/or provides network processing services for end devices 170.

Core network 120 may include one or multiple networks of one or multiple types and technologies. For example, core network 120 may be implemented to include a next generation core (NGC) for a 5G network. In other implementation, core network 120 may also include an Evolved Packet Core (EPC) of an LTE, a core network of an LTE-Advanced (LTE-A) network, and/or a core network of an LTE-A Pro network. Core network 120 may also include a legacy core network.

Depending on the implementation, core network 120 may include various types of network elements. For example, core network 120 may include 5G core components and/or combined 4G/5G core components, such as a user plane function (UPF), an access and mobility management function (AMF), a mobility and management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core network 120 may include additional, different, and/or fewer network devices than those described.

Service provider network 130 includes one or multiple networks of one or multiple types. For example, service provider network 130 may provide a back-end provisioning and configuration for core network 120 and access network 110. In another implementation, service provider network 130 may be implemented to provide an application and/or a service to end devices 160. For example, service provider network 130 may be implemented to include a service or an application-layer network, a cloud network, a packet-switched network, a private network, an Internet Protocol Multimedia Subsystem (IMS) network, a Rich Communication Service (RCS) network, a telecommunication network, an IP network, a wired network, a wireless network, or some combination thereof. Depending on the implementation, service provider network 130 may include various network devices that provide various applications, services, assets, or the like, such as servers (e.g., web, application, cloud, etc.), mass storage devices, and/or other types of network devices pertaining to various network-related functions.

Each of access network 110, core network 120, and service provider network 130 may include one or more network elements. Network elements may be implemented via VNFs 140 or PNFs 145 configured to perform network functions. Thus, environment 100 may be considered a hybrid network in the sense that network elements may be implemented as either VNFs 140 or PNFs 145 throughout access network 110, core network 120, and service provider network 130.

A VNF 140 may represent an access network node (e.g., a portion of an eNodeB node or gNodeB node), a core network node (e.g., an MME, an AMF, an SMF, a UPF, a combined 4G/5G function, etc.), or a service network node (e.g., a Call Session Control Function (CSCF) node, an application server (AS) node, a life cycle management (LCM) node, etc.). Moreover, a VNF 140 may represent a network node managing data traffic in a network, such a router, a switch, a firewall, a NAT device, a gateway, and/or another type of network device. Still further, a VNF 140 may represent a network node that functions as a controller in an optical network, such as a ROADM controller.

PNFs 145 may include dedicated hardware to perform a network function. In some instances, PNFs 145 may require dedicated hardware that cannot be virtualized (e.g., an RRU). In other instances, PNFs 145 may be used to perform functions similar to those of VNFs 140 (e.g., such as dedicated hardware in legacy environments or secure installations). According to implementations described herein, PNFs 145 may be configured with a PNF proxy 150 for life cycle management. PNF proxy 150 may be a virtual-machine based VNF or a containerized VNF with a vendor-defined interface to a PNF 145. PNF proxy 150 may represent one or more PNFs 145 to support LCM operations with management platform 160 in much the same manner as a VNF 140.

Management platform 160 may include one or more devices, such as computer devices and/or server devices to deploy VNFs 140 in network environment 100, to configure the deployed VNFs 140 to implement requested network services, and to track inventory of PNFs 145 (e.g., via PNF proxies 150) and VNFs 140. Management platform 160 may include, among other functions, a network function virtualization orchestrator (NFVO) and a virtual network function manager (VNFM). The NFVO may create, remove, and/or update VNFs 140, such as virtualized versions of core network 120 components (e.g., AMF, SMF, UPF, etc.). The VNFM may manage VNFs 140 and PNF proxies 150. For example, the VNFM may perform life cycle management of particular VNFs and PNF proxies 150, including instantiation, scaling, updating, and/or termination of particular VNFs based on instructions received from management platform 160. In other implementations, management platform 160 may include additional functions/components, such as an element management system (EMS), a service design and creation (SDC) function, a run-time service orchestrator (RSO), and an active and available inventory (AAI) function.

End device 170 includes a device that has computational and communication capabilities may receive services from access network 110, core network 120, and/or service provider network 130. End device 170 may be implemented as a mobile device, a portable device, or a stationary device. End device 170 may be implemented as a Machine Type Communication (MTC) device, an Internet of Things (IoT) device, an enhanced MTC device (eMTC) (also known as Cat-M1), a NB-IoT device, a machine-to-machine (M2M) device, a user device, or some other type of end node.

While proxies may be designed so they appear as regular VNFs (e.g., either VM-based or containerized VNFs) to an orchestrator (e.g., in management platform 160 or elsewhere in network environment 100), it may be necessary to specifically identify a VNF serving as a PNF proxy 150 to the orchestrator and/or to identify a PNF proxy 150 as such in an inventory system (e.g., in management platform 160 or elsewhere). Thus, systems and methods described herein may include a descriptor to identify a VNF as a PNF proxy 150. As one non-limiting example, the descriptor may include a new Topology and Orchestration Specification for Cloud Applications (TOSCA) type that can be added to existing TOSCA types for network functions to allow for an orchestrator to identify any proxy. As another example, a custom type-extension for the descriptor may be used to extend the base TOSCA type for network functions (e.g., tosca.nodes.nfv.VNF) to permit a proxy indication.

Figure 2:
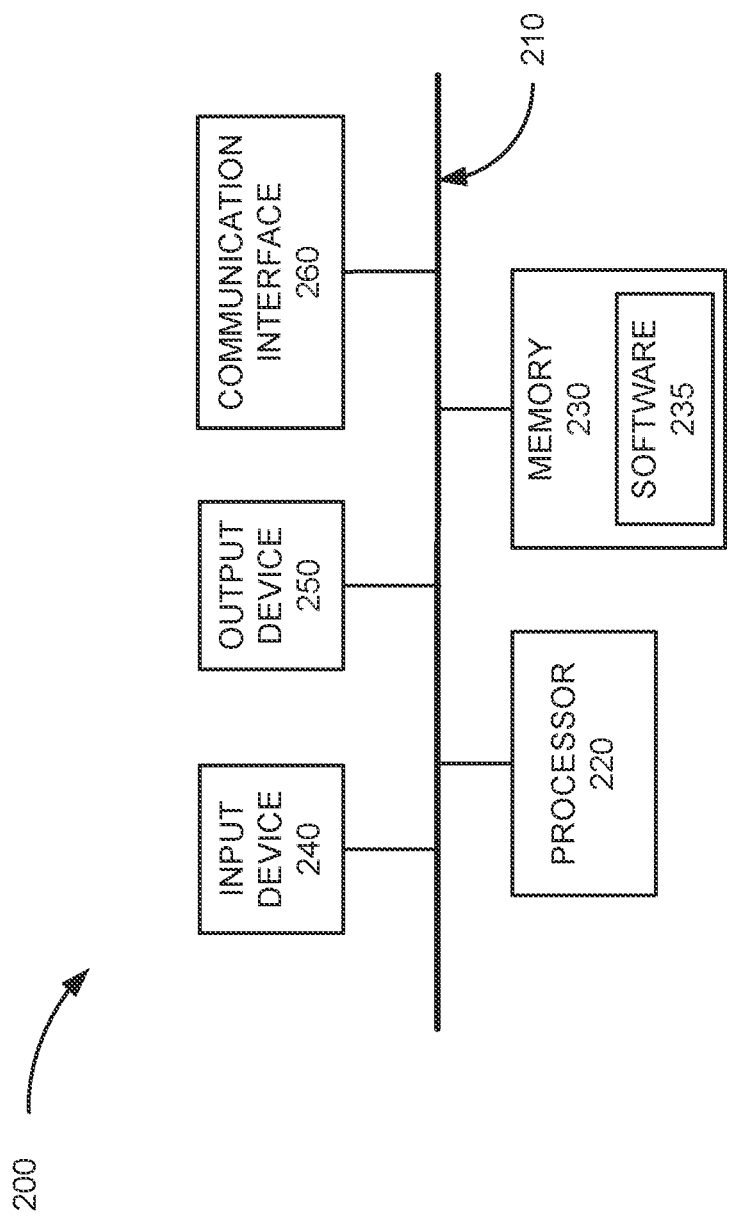
FIG. 2 is a diagram illustrating exemplary components of a device that may correspond to one or more of the devices illustrated herein.

FIG. 2 is a diagram illustrating exemplary components of device 200 according to an implementation described herein. VNFs 140, PNFs 145, PNF proxies 150, functions of management platform 160, end devices 170, and/or other devices in access network 110, core network 120, and service provider network 130 may each include one or more devices 200. As shown in FIG. 2, device 200 may include a bus 210, a processor 220, a memory 230 with software 235, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. For example, processor 220 may include one or more Central Processing Units (CPUs) and/or one or more Graphics Processing Units (GPU). In other embodiments, processor 220 may include an application-specific integrated circuit (ASIC), a field-programmable gate array (FPGA), and/or another type of integrated circuit or processing logic. Processor 220 may control operation of device 200 and its components.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device (e.g., a hard disk, optical, etc.), and/or a removable form of memory, such as a flash memory.

Software 235 includes an application or a program that provides a function and/or a process. Software 235 may also include firmware, middleware, microcode, hardware description language (HDL), and/or other form of instruction. By way of example, with respect to the network elements that include logic to provide virtual network functions, these network elements may be implemented to include software 235.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include input device 240 or output device 250. In other words, device 200 may be "headless" and may not include a keyboard or display, for example.

Communication interface 260 may include a transceiver that enables device 200 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to LCM operations and communications. Device 200 may perform these operations in response to processor 220 executing software instructions (e.g., software 235) contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
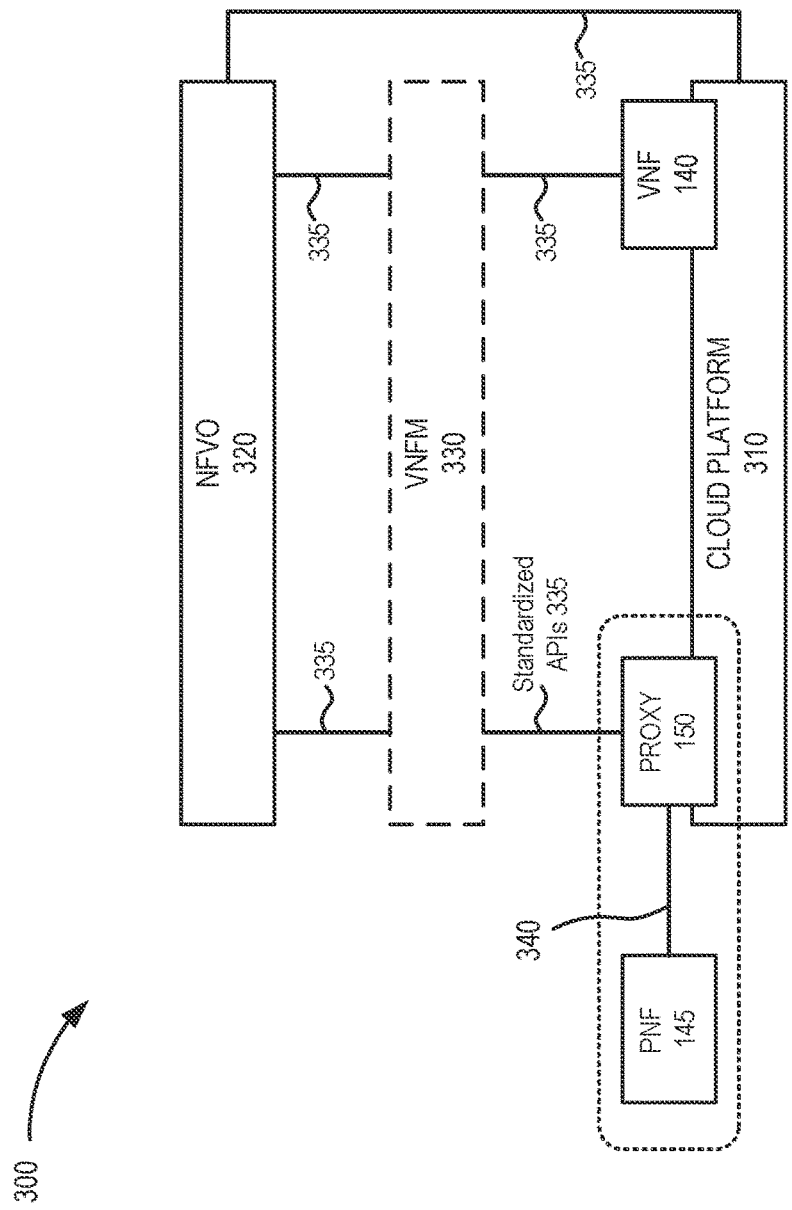
FIG. 3 is a diagram illustrating a virtualized network function architecture that may be used in a network environment.

FIG. 3 is a block diagram illustrating network function virtualization architecture in a portion 300 of network environment 100. Network portion 300 may include a cloud platform 310, a NFVO 320, and a VNFM 330. Cloud platform 310 may correspond to access network 110, core network 120, service provider network 130, another network, or portions thereof. NFVO 320 and VNFM 330 may be part of management platform 160, for example.

Cloud platform 310 may include a hybrid network that communicates with VNFs 140 and PNF proxies 150. A single VNF 140 and PNF proxy 150 are shown for simplicity. In practice, cloud platform 310 may include numerous VNFs 140 and/or PNF proxies 150.

NFVO 320 may create, remove, and/or update network functions implemented as VNFs 140 or PNFs 145 (e.g., via PNF proxies 150), such as virtualized versions of core components (e.g., AMF, SMF, UPF, etc.) at cloud platform 310 (e.g., access network, core network, a data center, private network, MEC, etc.).

VNFM 330 may manage VNFs 140 and PNFs 145 (e.g., via PNF proxies 150). VNFM 330 may perform life cycle management of particular VNFs, including instantiation, scaling, updating, and/or termination of particular VNFs 140 and PNFs 145 in cloud platform 310. According to an implementation, VNFM 330 may be implemented for both VM-based and containerized VNFs 140 and PNF proxies 150. In other implementations, VNFM 330 may not be used for non-VM-based (e.g., containerized) VNFs 140 and PNF proxies 150.

PNF proxy 150 enables life cycle management of PNF 145 in the same way as VNF 140. PNF proxy 150 may support standard interfaces 335 towards NFVO 320. In one implementation, PNF proxy 150 may support, towards orchestrator 320, the same life cycle management operations as available for VNF 140, such as INSTANTIATE, SCALE, UPGRADE, ROLLBACK, BACKUP, RESTORE, QUERY, TERMINATE, HEAL, OPERATE, MODIFY, etc. For example, NFVO 320/VNFM 330 and PNF proxy 150 may communicate using a standardized application programming interface (API) 335.

While operating with a standardized interface 335, some life cycle management operations may be configured as NULL for particular PNF 145/proxy 150 combinations. For example, where limitations of physical devices prevent certain LCM operations (e.g., scaling beyond the physical limitations of a PNF 145), LCM operations of PNF proxy 150 may be configured as NULL. In other implementations, conventional VNF LCM commands may be converted by PNF proxy 150 to an applicable command for PNF 145 (e.g., a "terminate" command may be translated to shut down a PNF 145).

According to an implementation, a PNF vendor may develop and deliver a PNF proxy package (e.g., including PNF 145 and code for PNF proxy 150) to a mobile network (e.g., a mobile network operator) for integration within network portion 300. PNF 145 and PNF proxy 150 may use a vendor designated interface 340. NFVO 320 and VNFM 330 would not communicate directly with PNF 145. Thus, no standardization of communications between PNF 145 and PNF proxy 150 is needed. PNF 145 and PNF proxy 150 may use standard APIs or a proprietary interface 340. As shown in FIG. 3, PNF proxy 150 may map to a single PNF 145. According to another implementation, a single PNF proxy 150 may map to multiple PNFs 145.

When creating an instance of PNF proxy 150 in network portion 300, NFVO 320 may configure the PNF proxy 150 with information on how to locate and communicate with the PNF(s) 145 that are being proxied. In one implementation, PNF proxy 150 can be provided directly with an IP address of a corresponding PNF 145. In another implementation, PNF proxy 150 can be provided with a key to query. For example, a key may be linked (e.g., by a Dynamic Host Configuration Protocol (DHCP) server) to a set of PNF IP addresses matching the key. The deployed PNF proxy 150 may be reflected in a VNF inventory, along with the PNF(s) 145 associated with each PNF proxy 150. Thus, the inventory system may track both VNF instances and physical inventory. According to another implementation, PNF proxies 150 can also be generalized to represent any physical resource such as network resource, in addition to PNFs.

Figure 4A:
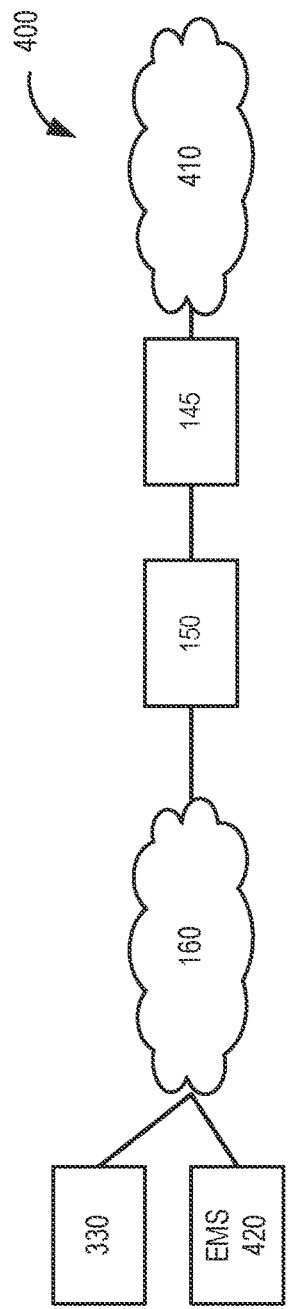
FIGS. 4A and 4B are block diagrams illustrating examples of different network arrangements for physical network function (PNF) proxies.
Figure 4B:
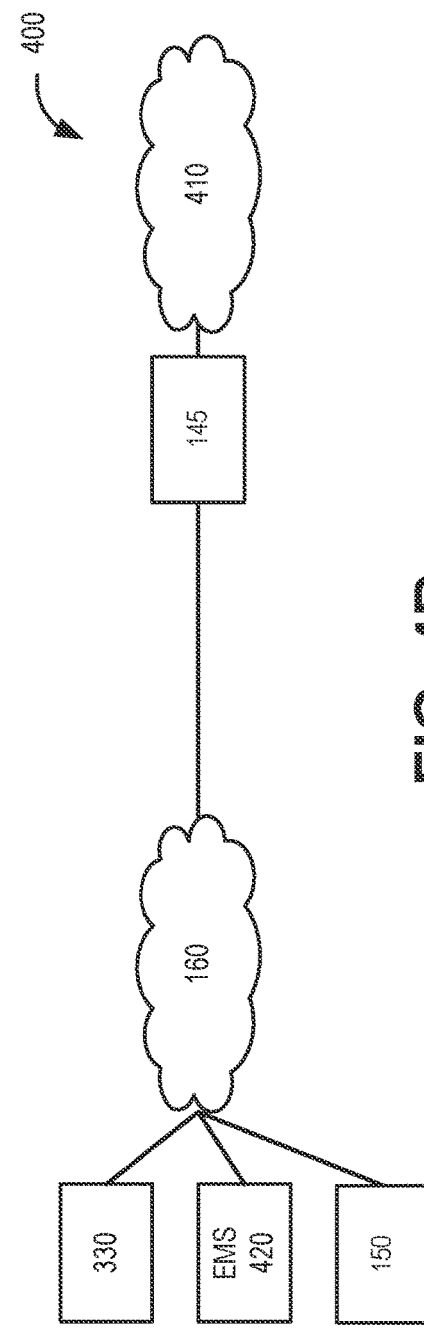

FIGS. 4A and 4B are block diagrams illustrating examples of different network arrangements for PNF proxies 150. Referring collectively to FIGS. 4A and 4B, a portion 400 of network environment 100 may include PNF 145, PNF proxy 150, management platform 160, VNFM 330, a services network 410, and an Element Management System (EMS) 420.

Services network 410 may include a network for which a PNF 145 may provide services. For example, services network 410 may include one of access network 110, core network 120, service provider network 130, a MEC network, or another network.

EMS 420 may include a network element to manage the functions and capabilities of network elements, which may include the implementation of particular network functions and PNF proxies at particular locations/sites. For example, in access network 110, a first VNF may correspond to a virtualized gNodeB, a second VNF may correspond to a virtualized UPF, a third VNF may correspond to a virtualized AMF, etc. In another implementation, EMS 420 may interface with, for example, components of distributed wireless access network, such as a CU, DU, and a PNF proxy of an RU for a radio access network (e.g., access network 110).

Referring to FIG. 4A, PNF 145 and PNF proxy 150 may be connected in local proximity within network portion 400. For example, a vendor may provide PNF 145 and PNF proxy 150 as a package to a mobile network operator (MNO). The PNF proxy package may include a proxy descriptor and external virtual links (VLs) for the type of PNF. PNF proxy 150 may be installed on hardware that is directly connected (e.g., via a direct wired connection) to and/or co-located with PNF 145 when PNF 145 is physically installed at a location in network portion 400. Wired communications between PNF 145 and PNF proxy 150 may be proprietary or standards-based.

Referring to FIG. 4B, PNF 145 and PNF proxy 150 may be connected via a network and remote from each other within network portion 400. For example, a vendor may provide PNF 145 and PNF proxy 150 as a package to the MNO. The PNF proxy package may include a proxy descriptor and external virtual links (VLs) for the type of PNF. 145. PNF 145 may be physically installed at one location in network portion 400, and PNF proxy 150 may be installed on hardware that is remotely connected (e.g., via a network connection) to PNF 145. Network communications between PNF 145 and PNF proxy 150 may be proprietary or standards-based.

Referring collectively to FIGS. 4A and 4B, after installation of the PNF 145, a base configuration may be applied to PNF 145 to enable network communications. PNF proxy 150 may be deployed as a VNF in the cloud platform. PNF proxy 150 may be configured and establish communication with PNF 145. PNF proxy 150 may apply firmware and/or software to PNF 145 based on the configuration of PNF proxy 150. PNF proxy 150 may then configure and/or life-cycle-manage PNF 145.

Instructions for life cycle management may be provided to PNF proxy 150 (e.g., from VNFM 330, EMS 420, etc.) via standard VNF interfaces (e.g., APIs 335). Life cycle management functions supported by PNF proxy 150 may include, for example, the following:

Upgrade—the proxy can understand the deployed environment through its configurations and retrieves and updates the software image of the PNF. In this case the proxy may behave like an EMS for the PNF; or the proxy may work with an EMS to update the software version of a PNF;

Configure—an orchestrator (e.g., NFVO 330) or EMS (e.g., EMS 420) can update configuration parameters of a PNF via its proxy;

Operate—an orchestrator (e.g., NFVO 330) can manage the administrative state of a PNF by starting and stopping the proxy;

Network connectivity—external connection points (CPs) can be defined for a proxy, and external virtual links (VLs) can be defined between a proxy and another VNF (in the form of a service chain) to define network connectivity for the PNF; and Backup and restore—an orchestrator (e.g., NFVO 330) or EMS (e.g., EMS 420) can take a snapshot of the PNF's configuration and use that snapshot at a later time to restore the PNF to a known state.

The above list of life cycle management functions supported by PNF proxy 150 is illustrative. In other implementations fewer, additional, or different standardized LCM functions may be supported depending on the type of PNF 145 and the vendor-supplied interface (e.g., interface 340).

Figure 5:
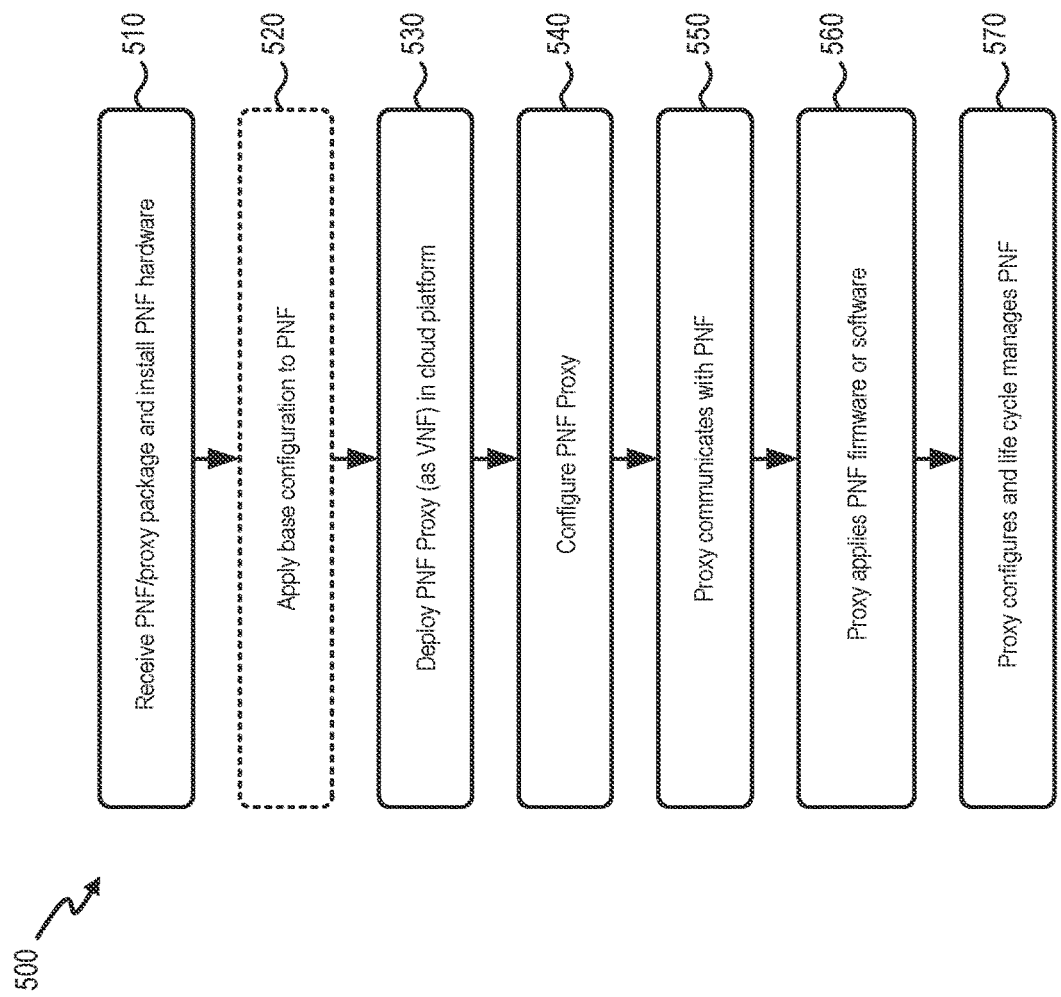
FIG. 5 is a flow diagram illustrating a process for deployment of a PNF and a PNF proxy in a network environment.

FIG. 5 is a flow diagram illustrating an example process 500 for deployment of a PNF and PNF proxy in a network environment. In one implementation, process 500 may be performed by devices in management platform 160. In another implementation, process 500 may be performed by devices in management platform 160 in conjunction with network technicians and other devices in network environment 100.

Process 500 may include receiving a PNF/proxy package and installing PNF hardware (block 510). For example, a PNF 145 may be installed in a cloud platform 310. A proxy-to-PNF link 340 can be directly connected or routed via a network. PNF proxy 150 can be co-located with or remote from PNF. The PNF/proxy package may include a proxy descriptor and external virtual links (VLs) for the type of PNF.

Process 500 may further include applying a base configuration to the PNF (block 520), and deploying the PNF proxy in a cloud platform (block 530). For example, PNF 145 may be provided with a basic software image to facilitate initial communications with PNF proxy 150. PNF proxy 150 may be deployed by an orchestrator based on a script or user interface. PNF proxy 150 may be instantiated, for example, based on a Helm chart.

The PNF/proxy package may include a proxy descriptor to distinguish PNF proxy 150 from a conventional VNF 140, for example. The proxy descriptor may be in the form of a modified VNF descriptor that is provided by a vendor with PNF 150. Except as noted herein, the descriptor may comply with a known standard, such as a TOSCA/YAML based service template for a VNF descriptor.

Figure 6:
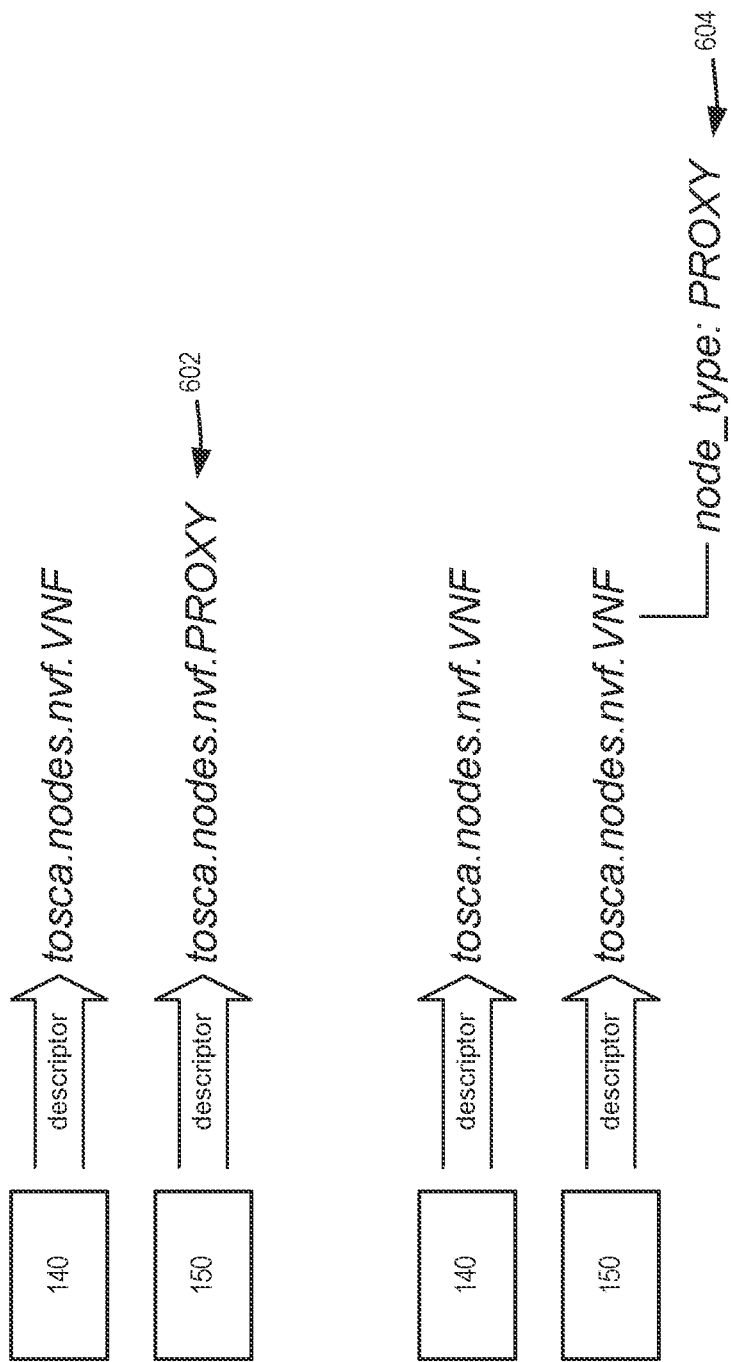
FIG. 6 includes examples of proxy descriptor formats, according to an implementation.

Examples of some proxy descriptor formats are provided in FIG. 6. As shown in FIG. 6, in one implementation, PNF proxy 150 may be distinguished from VNF 140 using a new node type designation 602 (e.g., "Proxy") in a TOSCA template, which may distinguish from existing node types (e.g., VNF, VDU, CP, etc.). The new "Proxy" node type may be included, for example, in an updated network standard.

As further shown in FIG. 6, in another implementation, PNF proxy 150 may be distinguished from VNF 140 using a custom type extension to extend the tosca.nodes.nfv.VNF type, using the node_types key to define a type 604 PROXY. The uniform use of this derived type PROXY may allow for an orchestrator to identify any proxy. The new derived type may be used within a domain such as an MNO domain. As a custom extension, the new derived type may be suitable for specification within an MNO's management and orchestration architectural framework, as compared to general standardization frameworks, for example.

In addition to proxy identification, the PNF descriptor may also specify external connectivity using, for example, base ExtVirtualLinkable types in VNF descriptors.

Returning to FIG. 5, process 500 may also include configuring the PNF proxy (block 540). For example, when creating an instance of a proxy, the orchestrator configures the proxy instance with information on how to locate/find and communicate with PNFs that are proxied. In one implementation, PNF proxy 150 can be provided directly with a network address (e.g., an IP address) of a PNF 145. In another implementation, PNF proxy 150 can be provided with a key to query another system (e.g., a DHCP server) for a set of PNF IPs matching the key. Once instantiated, PNF proxy 145 and the PNF(s) 150 associated with each proxy may be reflected in an active and available inventory (AAI).

Process 500 may further include the proxy communicating with the PNF (block 550), the proxy applying PNF firmware or software (block 560), and the proxy configuring and life-cycle managing the PNF (block 570). For example, once configured by NFVO 320/VNFM 330, PNF proxy 150 may establish communications (e.g., via interface 340) with PNF 145. PNF 150 may provide instructions and/or LCM operating information to PNF 145, such as initial firmware or software. PNF proxy 150 may then perform ongoing life cycle management functions, such as those described above in connection with FIG. 4.

Figure 7:
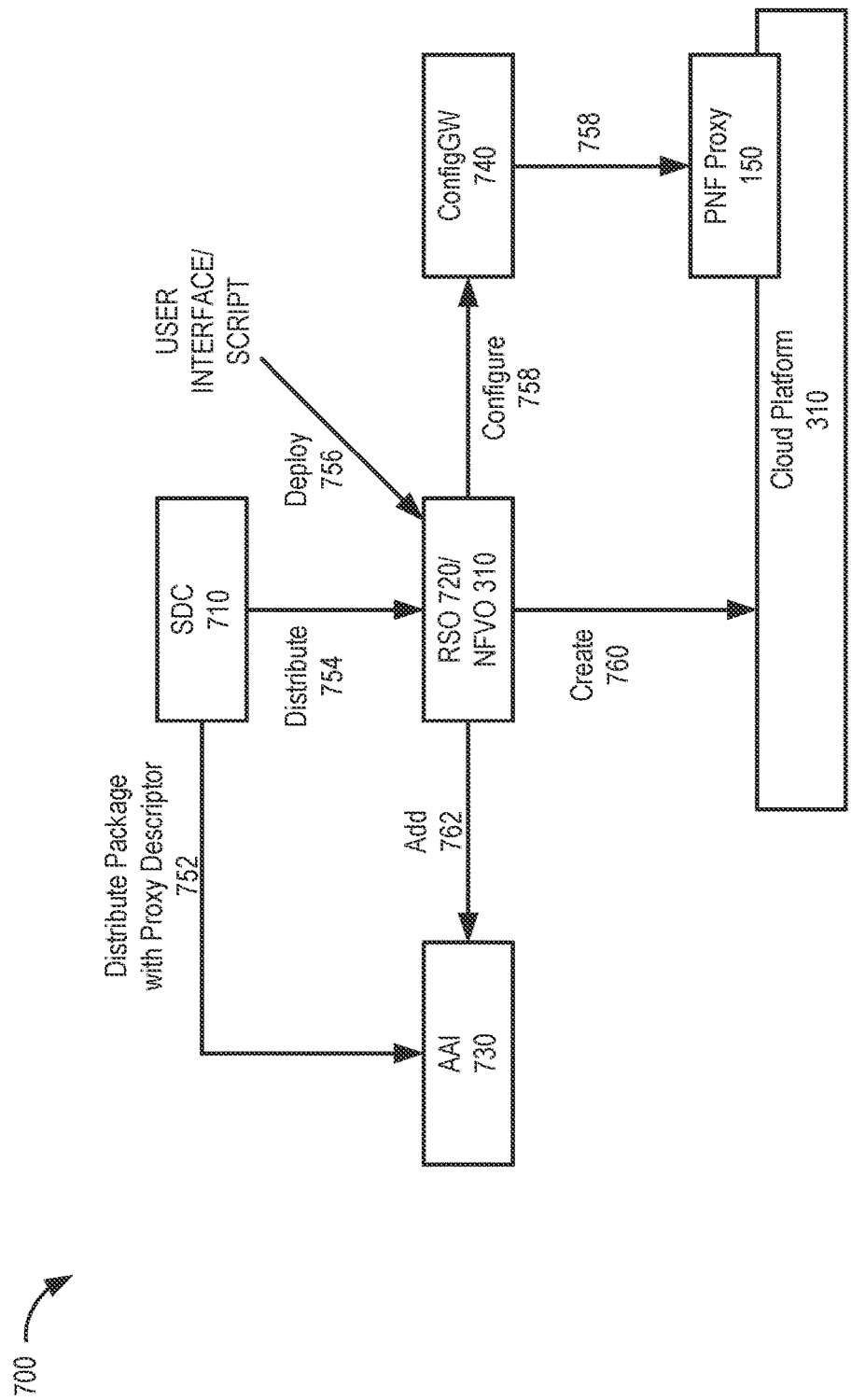
FIG. 7 is a block diagram illustrating example communications for establishing proxy-to-PNF association for network inventory, according to an implementation.

One important use case for PNF proxies 150 is to simplify establishing a unified inventory of physical assets. FIG. 7 is a block diagram illustrating an example of communications for establishing the proxy to PNF association in inventory in a portion 700 of network environment 100. Referring to FIG. 7, a portion 700 of network environment 100 may include PNF proxy 150 in cloud platform 330, a service design and creation (SDC) function 710, a run-time service orchestrator (RSO)/NFVO 310, an active and available inventory (AAI) function 730, and a configuration gateway (ConfigGW) 740.

As shown at references 752 and 754, a package that contains the proxy VNF descriptor is distributed from SDC 710 to both AAI 710 and RSO 720/NFVO 310. The proxy VNF descriptor is simply the proxy descriptor, which is a template for a particular type of PNF (e.g., from a specific vendor) but does not indicate the actual PNF that is associated with a particular instance of this proxy.

During deployment 756 of an instance of a proxy (by a user using a user interface, or by automation/script via API), the RSO 720/NFVO 310 may be supplied with the actual association of this proxy instance with an actual PNF (e.g., the IP address of the PNF). The PNF can for example have a dedicated IP address for communicating with the proxy, or the PNF may use a management IP address. During deployment 756, RSO 720/NFVO 310 may also be supplied with physical connectivity of the PNF with other elements in the network.

As shown at references 758 and 760, RSO 720/NFVO 310 may create and configure the proxy VNF like a regular VNF (e.g., proxy-PNF association can be part of a Day-1 configuration). Additionally, RSO 720/NFVO 310, recognizing the configuration as a proxy VNF (e.g., based on the proxy VNF descriptor), may add a proxy-PNF association to a record for the PNF proxy when adding 762 the newly created instance to AAI 710. As a proxy for a PNF, RSO 720/NFVO 310 may also add connectivity information (e.g., external VL information for the PNF) to the inventory. AAI 710 is, thus, provided with information of the physical assets and their connectivity in the network.

The foregoing description of embodiments provides illustrations but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks and signals have been described with regard to the processes illustrated in FIGS. 5 and 7, the order of the blocks and/or signals may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 220, etc.), or a combination of hardware and software (e.g., software 235). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 220) of a computational device. A non-transitory storage medium includes one or more of the storage mediums described in relation to memory 230.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
    associating, by a network management device, an instance of a physical network function (PNF) proxy with an installed PNF, wherein the PNF proxy includes a virtual network function (VNF) having a proxy descriptor to identify the VNF as a PNF proxy;
    creating, by the network management device, the instance of the PNF proxy as a VNF in a cloud platform;
    adding, by the network management device, a record of the created instance of the PNF proxy to an active inventory system; and
    providing, by the network management device and to the instance of the PNF proxy, life-cycle management instructions for the installed PNF.

2. The method of claim 1, wherein providing the life-cycle management instructions includes:
    providing, to the instance of the PNF proxy, firmware or a software image for installation on the installed PNF.

3. The method of claim 1, wherein the proxy descriptor includes one of:
    a Topology and Orchestration Specification for Cloud Applications (TOSCA) type for the PNF proxy, or
    a TOSCA type extension for a VNF that indicates a PNF proxy.

4. The method of claim 1, wherein the VNF further includes network connectivity information for the PNF proxy.

5. The method of claim 1, wherein providing the life-cycle management instructions includes:
    updating configuration parameters of the installed PNF.

6. The method of claim 1, wherein associating the instance of the PNF proxy with an installed PNF includes mapping the PNF proxy to multiple PNFs.

7. The method of claim 1, wherein providing the life-cycle management instructions includes:
    providing instructions to manage an administrative state of the PNF.

8. The method of claim 1, further comprising:
    retrieving, via the instance of the PNF proxy, a snapshot of the PNF's configuration; and
    restoring, via the instance of the PNF proxy, the PNF's configuration based on the snapshot.

9. The method of claim 1, wherein the PNF includes a remote radio unit (RRU) for an access device of a radio access network.

10. The method of claim 1, wherein the network management device includes one of:
a network function virtualization orchestrator (NFVO),
a virtual network function manager (VNFM),
an element management system (EMS),
a service design and creation (SDC) function,
a run-time service orchestrator (RSO), or
an active and available inventory (AAI) function.

11. A network device comprising:
a processor configured to:
associate an instance of a physical network function (PNF) proxy with an installed PNF, wherein the PNF proxy includes a virtual network function (VNF) having a proxy descriptor to identify the VNF as a PNF proxy;
create the instance of the PNF proxy as a VNF in a cloud platform;
add a record of the created instance of the PNF proxy to an active inventory system; and
provide, to the instance of the PNF proxy, life-cycle management instructions for the installed PNF.

12. The network device of claim 11, wherein, when providing the life-cycle management instructions, the processor is further configured to:
provide, to the instance of the PNF proxy, firmware or a software image for installation on the installed PNF.

13. The network device of claim 11, wherein the proxy descriptor includes:
a Topology and Orchestration Specification for Cloud Applications (TOSCA) type for the PNF proxy.

14. The network device of claim 11, wherein the proxy descriptor includes:
a Topology and Orchestration Specification for Cloud Applications (TOSCA) type extension for a VNF that indicates a PNF proxy.

15. The network device of claim 11, wherein, when providing the life-cycle management instructions, the processor is further configured to:
send the life-cycle management instructions via a standardized application programming interface (API).

16. The network device of claim 11, wherein, when creating the instance of the PNF proxy, the processor is further configured to:
provide, to the instance of the PNF proxy, information on how to locate and communicate with the installed PNF.

17. A non-transitory, computer-readable storage medium storing instructions executable by a processor of a network device for:
associating, by a network management device, an instance of a physical network function (PNF) proxy with an installed PNF, wherein the PNF proxy includes a virtual network function (VNF) having a proxy descriptor to identify the VNF as a PNF proxy;
creating, by the network management device, the instance of the PNF proxy as a VNF in a cloud platform;
adding, by the network management device, a record of the created instance of the PNF proxy to an active inventory system; and
providing, by the network management device and to the instance of the PNF proxy, life-cycle management instructions for the installed PNF.

18. The non-transitory, computer-readable medium of claim 17, wherein the instructions for providing the life-cycle management instructions further include instructions for:
providing, to the instance of the PNF proxy, firmware or a software image for installation on the installed PNF.

19. The non-transitory, computer-readable storage medium of claim 17, wherein the instructions for providing the life-cycle management instructions further include instructions for:
updating configuration parameters of the installed PNF.

20. The non-transitory, computer-readable storage medium of claim 17, wherein the instructions for providing the life-cycle management instructions further include instructions for:
providing instructions to start or stop the PNF proxy.

* * * * *